Figure 1:
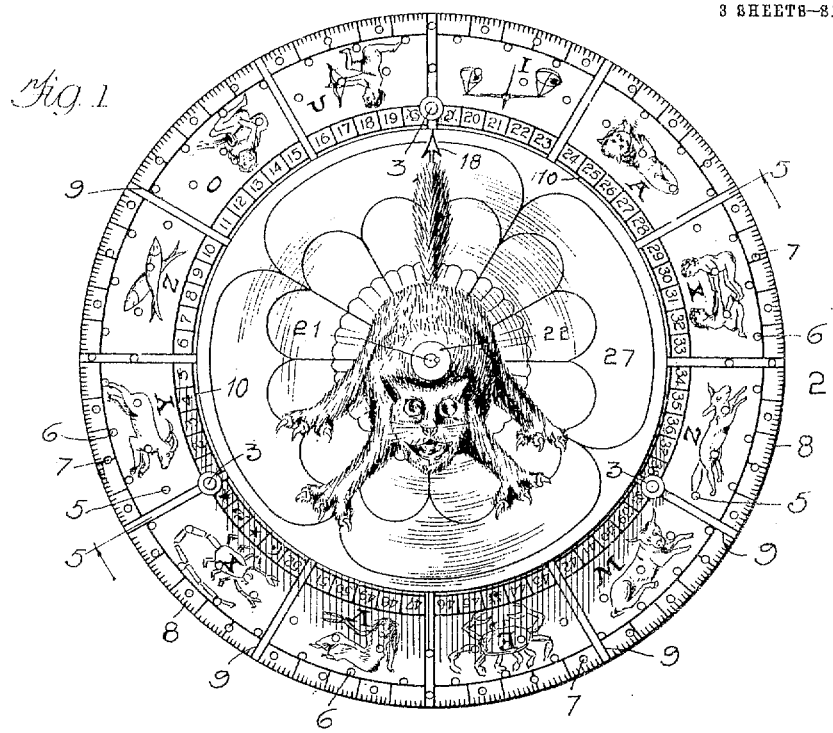

C. E. FISHER.
EDUCATIONAL AND AMUSEMENT DEVICE.
APPLICATION FILED DEC. 3, 1909.

973,186.

Patented Oct. 18, 1910.

3 SHEETS—SHEET 1.

Witnesses:
Robert K. Weir
Harold G. Barrett

Inventor:
Chas. E. Fisher
By A. W. Richards, atty

C. E. FISHER.
EDUCATIONAL AND AMUSEMENT DEVICE.
APPLICATION FILED DEC. 3, 1909.

973,186.

Patented Oct. 18, 1910.

3 SHEETS—SHEET 2.

Witnesses:
Robert N. Weir
Harold G. Bartlett

Inventor:
Chas. E. Fisher,
By N. W. Richards, atty.

C. E. FISHER.
EDUCATIONAL AND AMUSEMENT DEVICE.
APPLICATION FILED DEC. 3, 1909.

973,186.

Patented Oct. 18, 1910.

3 SHEETS—SHEET 3.

Fig. 6.

QUESTIONS
1. SHALL I TRUST HIM?
2. HAVE I A DANGEROUS RIVAL?
3. HOW MANY TIMES WILL I MARRY?
4. DOES HE REALLY LOVE ME?
5. AM I THOUGHT BEAUTIFUL?
6. WILL I GET A HUSBAND?
7. WILL MY HUSBAND TREAT ME WELL?
8. HAVE I ANY ENEMIES?

Fig. 7.

TABLES

|   | A | E | I | O | U | V | W | X | Y | Z |
|---|----|----|----|----|----|----|----|----|----|----|
| 1 | 70 | 30 | 10 | 50 | 5  | 1  | 40 | 15 | 20 | 60 |
| 2 | 61 | 46 | 16 | 49 | 21 | 32 | 5  | 36 | 39 | 69 |
| 3 | 52 | 47 | 17 | 68 | 22 | 33 | 41 | 37 | 62 | 42 |
| 4 | 53 | 48 | 18 | 6  | 23 | 34 | 35 | 38 | 63 | 1  |
| 5 | 54 | 2  | 19 | 7  | 24 | 11 | 14 | 65 | 64 | 66 |
| 6 | 45 | 3  | 27 | 8  | 25 | 13 | 12 | 55 | 68 | 43 |
| 7 | 43 | 4  | 28 | 9  | 26 | 56 | 57 | 58 | 59 | 67 |
| 8 | 44 | 29 | 31 | 10 | 70 | 60 | 53 | 44 | 3  | 2  |

Fig. 8.

ANSWERS
A  NO
E  YES
I  TWO
O  YES
U  BY SOME
V  YES
W  NO
X  NO
Y
Z

Fig. 9.

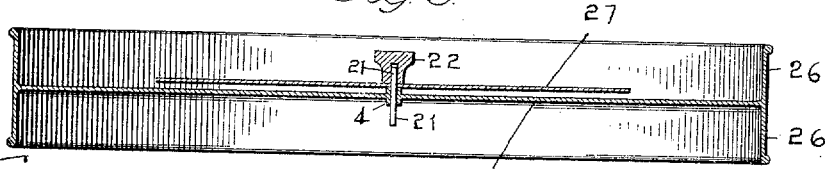

Witnesses:
Robert H. Weir
Harold S. Barrett

Inventor:
Chas. E. Fisher,
By H. W. Richards, atty.

THE NORRIS PETERS CO., WASHINGTON, D. C.

UNITED STATES PATENT OFFICE.

CHARLES E. FISHER, OF SAN FRANCISCO, CALIFORNIA, ASSIGNOR OF ONE-HALF TO GEORGE W. DAVIS, OF HAYWARDS, CALIFORNIA.

EDUCATIONAL AND AMUSEMENT DEVICE.

973,186.	Specification of Letters Patent.	Patented Oct. 18, 1910.

Application filed December 3, 1909. Serial No. 531,239.

*To all whom it may concern:*

Be it known that I, CHARLES E. FISHER, a citizen of the United States, and a resident of San Francisco, in the county of San Francisco and State of California, have invented a new and useful Educational and Amusement Device, of which the following is a specification.

My invention relates to a device which may be employed for creating an interesting source of amusement and diversion at gatherings of a number of persons, and which may be also used as a means for engaging and interestedly concentrating a child's mind while teaching him the letters of the alphabet and the numerals.

The principal object of the invention is to provide a suitably embellished device of the nature described which is of such character that it will be of absorbing interest; which is provided with suitable means whereby amusing answers to questions may be answered; which may be employed by a host or hostess to award prizes, and may be further used to teach a child the elements of his education.

Other objects will be in part obvious and in part pointed out.

To the end of carrying out these objects, my invention consists essentially in a suitably colored, figured and double faced stationary disk superposed by a similarly decorated double faced revoluble disk.

In order to enable the invention to be clearly understood and more easily carried into practice, I have appended hereto several sheets of drawings, upon which I have fully illustrated the nature of my said improvements.

Figure 2:
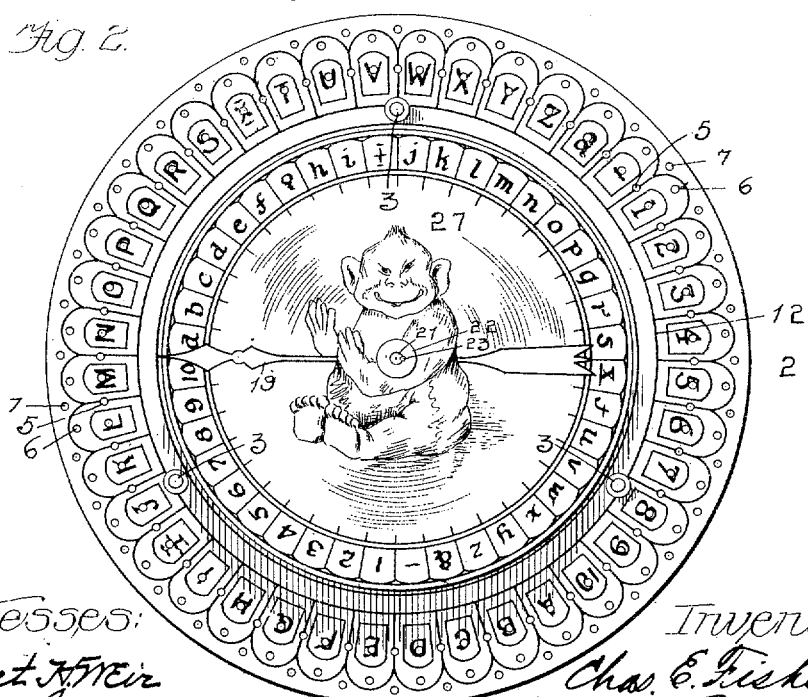
Figure 3:
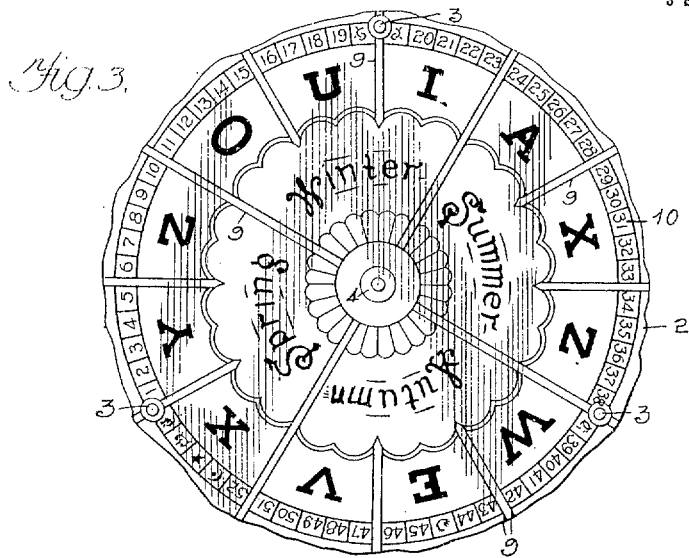
Figure 4:
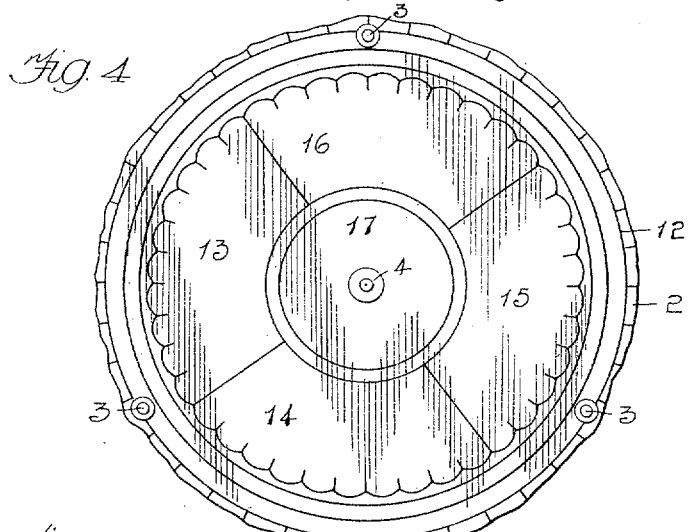
Figure 5:
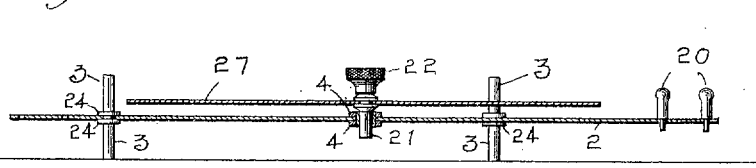

In said drawings: Figure 1 is a plan view of a device embodying my invention, assembled, showing the obverse faces of both the stationary and the revoluble disks; Fig. 2, a similar view, showing the reverse faces thereof; Fig. 3, a fragmental detail, a plan, showing that part of the face of the stationary disk illustrated at Fig. 1 which is therein obscured by the revoluble disk, and a small portion thereof exterior to said revoluble disk; Fig. 4, a similar view of the obscured portion of the stationary disk shown at Fig. 2, and a small portion thereof exterior to the revoluble disk; Fig. 5, a vertical, central section, taken in the line 5—5 in Fig. 1; Fig. 6, a plan view of one of the pages of the book of questions hereinafter referred to; Fig. 7, a similar view of a page of the book of tables, also hereinafter referred to; Fig. 8, a similar view of a page of the book of answers, likewise hereinafter referred to; and Fig. 9, a central sectional view of a modified form of the device.

Before proceeding to the description I desire to state that the pictorial representations and embellishments illustrated are arbitrary and optional, and may be of any desired and preferred character.

Similar reference characters are employed to indicate corresponding parts in the several views.

2 represents a stationary disk which may be formed of metal, papier-mâché, pasteboard or any other suitable material. It is provided on each of its faces with supporting legs 3, and is centrally apertured through a hub or reinforce plate 4 to form a shaft bearing for a purpose presently described. Near its perimeter it is provided with a plurality of annular series of apertures 5, 6 and 7 unequidistant from its edge, which apertures are adapted to selectively receive pins or pegs, 20, see Fig. 5. I have illustrated the rim or border of its obverse face as provided with a scale 8. Just within the annular scale are represented the twelve symbols of the zodiac, and in the same spaces, formed by the radial divisional lines 9, appear arbitrary letters of the alphabet. Within a circle 10 concentric to the one at the border are shown the numbers 1 to 52 inclusive, and several arbitrary symbols. Within the circle 10 and spaced by the lines 9 are letters corresponding to those occupying the same spaces as do the zodiacal symbols. See Fig. 3. The names of the four seasons appear next the center of the disk.

On the reverse of the stationary disk and at the outer portion thereof, appear the numerals 1 to 9 inclusive, as well as the capital letters of the complete alphabet and arbitrary signs or symbols, all arranged within a circle formed by the border line and by a line 12. The portion within this line 12 is subdivided into 4 divisions, 13, 14, 15 and 16, each preferably represented by a different color, and the portion 17 is decorated as preferred.

The obverse of the upper disk 27 is shown as imprinted with a ludicrous pictorial representation of a cat, from the distended tail of which projects an arrow 18. Festoons occupy the rest of this face of the revoluble disk. The border of its reverse is provided with numerals, small letters and symbols corresponding to those on the border of the obverse face of the lower disk, while a pictorial representation of the image "Billikens" is shown as occupying the central portion. An arrow 19 is displayed, its point reaching to the edge of the disk.

It will be evident from what follows that the disks are reversible—in other words, either face of the upper disk may be used with either face of the lower one. Also, while I have illustrated the arrows as being painted on the upper disk, it will be understood that they may be separate therefrom but secured thereto to revolve therewith. The upper disk is of smaller circumference than is the lower one and is provided at its center with upwardly and downwardly extending stub-axles 21, each of which is provided with a longitudinal groove and either of which is adapted to seat in the aperture in the reinforce plate 4. A centrally apertured spinning-nut 22 provided with a rib 23 fits over either axle 21, its rib fitting within the groove therein, providing a convenient means of spinning the wheel. A sleeve 24 is suitably fixed on each leg 3 both above and below the disk 2 to securely hold it from wobbling.

In the modification at Fig. 9 I have shown a disk which is in effect practically a tray provided with a double flange 26. Its purposes and objects will be evident and it will be clear that either or both disks may be so provided.

While I have illustrated and described the preferred embodiment of the invention, it will be understood that without departing from the essential spirit and scope thereof, or sacrificing any of the advantages thereof, it is susceptible of various changes of construction and organization.

The various uses to which the device may be put are practically illimitable; I shall, however, describe a few thereof. To teach a child the letters of the alphabet, the teacher will spin the revoluble disk by the means described. The arrow thereon will point to one of the letters or numerals, and the child be asked to tell its name. His interest is drawn to the game, and the letter or numeral will become more quickly and definitely fixed in his mind than by any other method known to me. If both alphabets, i. e., the small letters and capitals are faced upward, after the pupil has correctly named the capital letter, he may be required to find the corresponding small letter on the upper disk. The signs of the zodiac may be taught in the same manner. A multiplicity of games may be taught children, especially by a trained kindergartner. If prizes are to be awarded, pegs 20 may be placed in selective apertures 5, 6 or 7, the awards being made according to any predetermined plan or system, which may be as follows: Placement of a peg in a selective one of the series 7 thereof plays four letters or numerals, two on each side of the peg. Should the needle stop at any position between the outer ones of these four, the player having pegged the same, wins, providing (in order to induce study and to cultivate memory) he can name or call out the letters or numerals (or both) which he has pegged. Placing the peg in the series of holes 6 plays three letters or numerals, one on either side of the peg and the one pegged. To play two letters or numerals, place the peg in the series 5, between two letters or numerals, and to play letter, it alone may be pegged. The relationship of the holes 5, 6, and 7 with the letters and numerals, caused by the arrow and the pegs, also establishes relationship between the numerals and letters on the larger and smaller disks respectively, inasmuch as both are indicated by the same pegged aperture. The holes on that side of the disk where the signs of the zodiac appear have no significance, and are there only because it could not be avoided. Again, one player can choose one-half of the wheel, and another the other half. Or several players may each choose a color or division of the wheel. In some games it will be desired to determine a loser, all others being "out," the loser paying some penalty or forfeit, or being required to perform some act or feat supposed at least to be unpleasant to him.

Books of questions, answers and tables are furnished with each wheel. One page, or part of one page of each is illustrated at Figs. 6. 8 and 7, respectively. To play the game of "Questions," the players may proceed in the following manner: Let the one desiring to have a question answered select some question from the book thereof and reveal the number or index thereof to the person holding the book of tables, which person will thereupon spin the revoluble disk, and note the numeral at which the arrow or needle stops. The operator will then find the number of the question at the left hand side, it being printed in red or other conspicuous color. He will trace across from left to right until he comes to the number under the letter given by the one asking the question, which number will indicate the number of the answer in the book of answers. He will then turn to said book, find that number, and opposite the letter indicated by the arrow will be the answer. For instance: Suppose question Number 5 is asked. Spin the wheel and suppose the needle to stop at V. Turn to book of tables and follow Number 5 across until column headed V is reached. The answer will be found to be under some certain page number in the book of answers, and by searching thereon until "V" is found, the answer will be found on that line. There is no limit to the number of questions and answers; the game therefore never becomes old.

Having thus described the construction and operation of a preferred embodiment of my invention, and having illustrated it sufficiently to convey to others the manner of its embellishment and use, I claim as new and as my invention the following, to-wit:

1. A device of the character described comprising a stationary disk having printed or inscribed on it a circle containing radial divisions on both of its faces, each of said divisions provided with a scale and with pictorial representations, there being apertures arranged in concentric circles near the border of said disk, said apertures lying in unequal radial planes, said disk including supporting means on both its faces, and also including a centrally disposed hub which constitutes a bearing, and a smaller disk having a centrally disposed stub-axle projecting from each of its faces and revolubly mountable in said bearing, the last recited disk concentric to and of smaller diameter than the stationary one, whereby the aforesaid spaces, representations and apertures are visible and accessible, and whereby pegs may be inserted in said apertures without interfering with the revolution of the smaller disk, the latter having imprinted on each of its faces an arrow to indicate some one of said pegs.

2. A device of the character described comprising a reversible, stationary, embellished disk provided with a centrally disposed hub having an aperture extending entirely therethrough to form a bearing, and with an annular flange projecting both upwardly and downwardly to form a walled tray, and a disk having a centrally disposed stub-axle projecting in both directions and revolubly mountable in said bearing, the last recited disk being concentric to and of smaller diameter than the stationary disk, whereby objects positioned between the perimeter of the smaller disk and the uppermost one of the aforesaid flanges will not interfere with the rotation of said smaller disk, said revoluble disk lying in a higher horizontal plane than the stationary disk.

3. A device of the character described comprising a reversible stationary disk provided on one of its faces with an annular series of numerals arranged in proper sequence, and provided on its reverse face with the letters of the alphabet and a sequence of numerals, there being apertures in concentric circles near the border of said disk, said apertures lying in unequal radial planes, said disk including supporting means on both its faces and provided with a centrally disposed hub constituting a bearing, and a disk having a centrally disposed stub-axle projecting from each of its faces, said axle revolubly mounted in said bearing, the last recited disk being concentric to and of smaller diameter than the stationary disk whereby the aforesaid spaces, representations and apertures are visible, and whereby pegs may be inserted in said apertures without interfering with the revolution of the smaller disk, the latter having imprinted on each of its faces an arrow to indicate some one of said pegs, in combination with a book of questions and answers, each of said questions and answers being indicated by an index number coinciding with one of the numerals on the stationary disk.

4. A device of the character described comprising a reversible stationary disk provided with suitable embellishments on both of its faces, a centrally disposed reinforce plate or hub projecting both upwardly and downwardly and provided with a bearing in both of its ends, and a disk provided with a centrally disposed stub-axle extending in both directions and revolubly seated in said bearing, the last recited disk being of smaller diameter than the one first recited and being supported thereabove by said hub.

5. A device of the character described comprising a reversible stationary disk provided with suitable embellishments on both its faces, and with concentric series of peg-receiving apertures near its border, said apertures lying in non-equal radial planes, a centrally disposed hub projecting both upwardly and downwardly from said disk and provided with a bearing in both its ends, and a disk provided with a centrally disposed stub-axle extending in both directions and revolubly seatable in said bearing, the revoluble disk being imprinted on both of its faces with an arrow whereby one of said peg-receiving apertures is indicated, and of less diameter than the one first recited, and supported thereabove by said hub.

Signed at San Francisco, in the county of San Francisco and State of California this 18th day of October, 1909.

CHARLES E. FISHER.

Witnesses:
WILSON LYFORD,
CLARENCE F. GEORGE.